US010540058B2

(12) United States Patent
Bilancio et al.

(10) Patent No.: US 10,540,058 B2
(45) Date of Patent: Jan. 21, 2020

(54) NETWORK AND METHOD FOR CASTING A USER INTERFACE

(71) Applicant: WHIRLPOOL CORPORATION, Benton Harbor, MI (US)

(72) Inventors: Nathan Bilancio, St. Joseph, MI (US); Alexander Clayton, Saint Joseph, MI (US); Brandon L. Satanek, Stevensville, MI (US); Wen Shi, Stevensville, MI (US); James O. Thompson, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 856 days.

(21) Appl. No.: 14/990,906

(22) Filed: Jan. 8, 2016

(65) Prior Publication Data

US 2017/0199629 A1   Jul. 13, 2017

(51) Int. Cl.
*G06F 3/00* (2006.01)
*G06F 3/0482* (2013.01)
*G06F 9/451* (2018.01)
*G06F 3/0484* (2013.01)
*G06F 8/34* (2018.01)
*G06F 8/38* (2018.01)
*G06F 3/01* (2006.01)

(52) U.S. Cl.
CPC .......... *G06F 3/0482* (2013.01); *G06F 3/0484* (2013.01); *G06F 8/34* (2013.01); *G06F 8/38* (2013.01); *G06F 9/451* (2018.02)

(58) Field of Classification Search
CPC ...... G06F 3/0482; G06F 3/0484; G06F 9/451; G06F 8/34; H04L 12/2803
See application file for complete search history.

(56) References Cited

U.S. PATENT DOCUMENTS

| 8,645,842 | B2 * | 2/2014 | Kondziela | G06F 8/38 715/751 |
| 2001/0025349 | A1 * | 9/2001 | Sharood | G06Q 30/0235 713/340 |
| 2003/0117433 | A1 * | 6/2003 | Milton | H04L 29/06 715/738 |
| 2012/0316984 | A1 * | 12/2012 | Glassman | G06Q 10/06 705/26.7 |
| 2013/0052946 | A1 * | 2/2013 | Chatterjee | H04W 4/80 455/41.1 |
| 2013/0277353 | A1 | 10/2013 | Joseph et al. | |
| 2013/0325939 | A1 * | 12/2013 | Shim | G06Q 50/10 709/203 |

(Continued)

OTHER PUBLICATIONS

European Search Report for Counterpart EP16199225.0, dated Mar. 23, 2017.

*Primary Examiner* — Nicholas Augustine
(74) *Attorney, Agent, or Firm* — McGarry Bair PC

(57) ABSTRACT

A home network can comprise at least one appliance with an appliance interactive display and at least one mobile device with a mobile interactive display. An application on the mobile device or the appliance can be configured to enable a user to create a user interface on the appliance or mobile device interactive displays. The user interface can be cast to the other of the mobile device or the appliance on which it was created and can be interacted with independent of where the user interface was created.

19 Claims, 10 Drawing Sheets

(56) References Cited

U.S. PATENT DOCUMENTS

| | | | |
|---|---|---|---|
| 2014/0191856 A1* | 7/2014 | Cho | G08C 17/02 340/12.54 |
| 2014/0192182 A1 | 7/2014 | Wait | |
| 2014/0304126 A1 | 10/2014 | Kim et al. | |
| 2014/0355588 A1 | 12/2014 | Cho et al. | |
| 2015/0073612 A1 | 3/2015 | Ireland et al. | |
| 2015/0234372 A1* | 8/2015 | Slupik | G05B 15/02 700/275 |
| 2016/0334943 A1* | 11/2016 | Jeon | H04L 12/282 |
| 2017/0205791 A1* | 7/2017 | Yang | G06Q 10/20 |
| 2017/0323640 A1* | 11/2017 | Sisodia | G06Q 30/06 |

\* cited by examiner

NETWORK AND METHOD FOR CASTING A USER INTERFACE

BACKGROUND

Home appliances have user interfaces enabling a user to operate and interact with the appliance. As technology advances, users are increasingly interested in the functionality associated with the appliances. Enabling the user to utilize the user interface in appliances beyond typical operation of the appliance can expand the capability of the appliance. However, typical interaction with the user interface of the appliance is limited to local usage of the appliance, limiting the functionalities of the appliance to within the local space of the user, such as the home or even a particular room within the home.

BRIEF DESCRIPTION

In one aspect, a mobile device for use with a home network including one or more appliances having an appliance interactive display and an appliance communication module has a mobile interactive display; a mobile communication module; and an application on the mobile device. The application is configured to receive and display on the mobile interactive display a received user interface cast from the appliance and enable a user to create a user interface on the mobile interactive display and to cast the created user interface to the appliance interactive display when the mobile communication module is in communication with the appliance communication module. The received user interface on the mobile interactive display can be changed by a user interacting with the mobile interactive display independently of the appliance.

In another aspect, a home appliance configured to perform a physical operation on an article includes an appliance interactive display; an appliance communication module; and an application on the appliance. The application is configured to enable a user to create a user interface on the appliance interactive display and configured to enable a user to cast the user interface, where the user interface can be changed independently of the appliance.

In another aspect, a method of casting a user interface between a mobile device and an appliance includes creating a user interface with an application on a mobile interactive display of the mobile device or an appliance interactive display on the appliance and casting the created user interface from the one to the other. A user can change the user interface by interacting with the mobile interactive display on the mobile device or the appliance interactive display on the appliance to which the user interface is cast.

DETAILED DESCRIPTION

Figure 1:
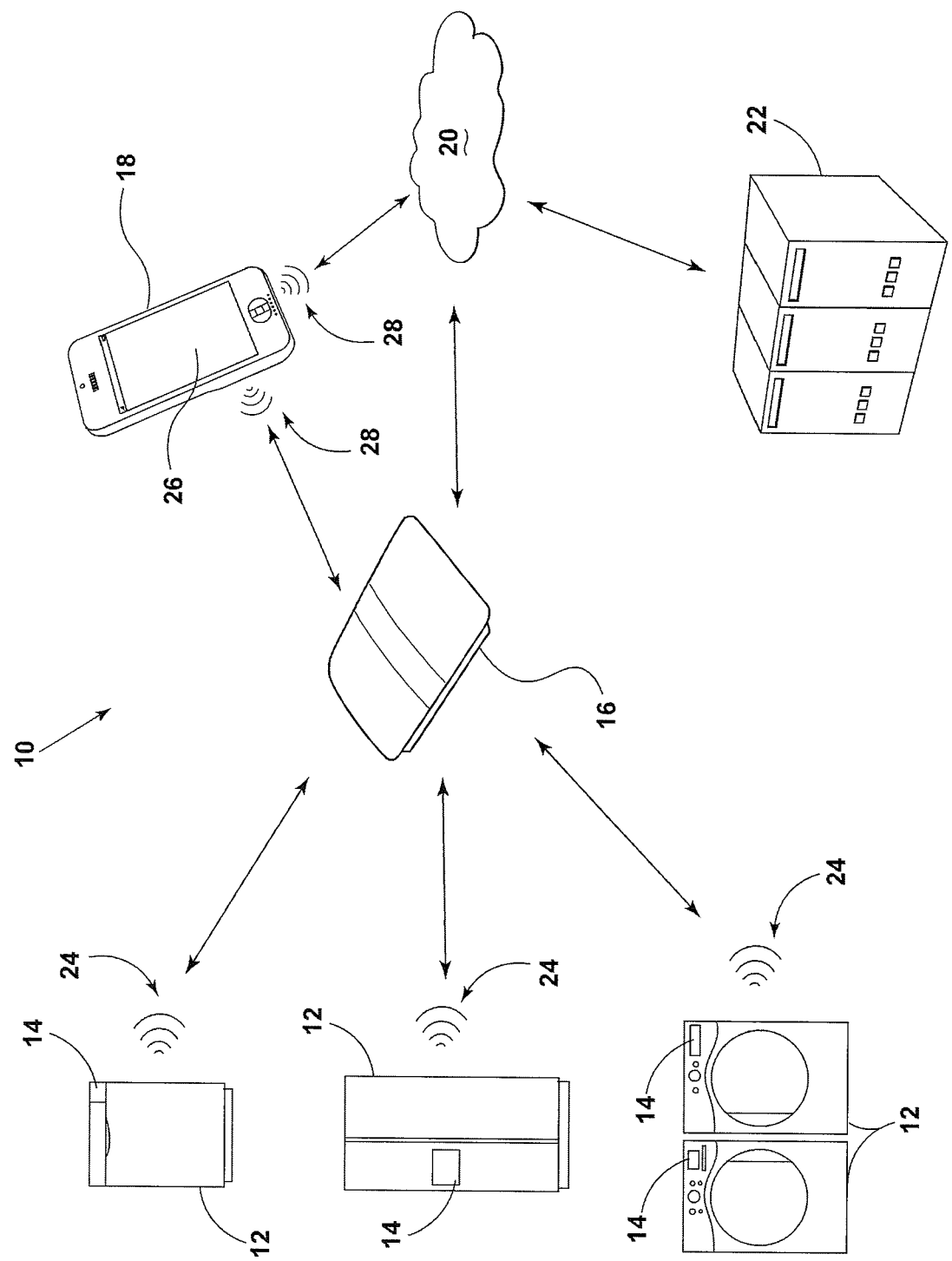
FIG. 1 is a schematic view of a network for casting information between a mobile device and an appliance.

FIG. 1 is a schematic view of a network 10 according to one embodiment of the invention. The network 10 includes at least one appliance 12, each appliance 12 having an appliance interactive display 14. The appliances 12 can be in communication with a router 16. The router 16 can be provided for forwarding data between the appliances 12 and the other devices in the network 10. Optionally, the appliances 12 can be part of a home network or home area network (HAN) for communication with other devices within a home. The router 16 can be in communication with at least one mobile device 18 over the network 10, such as the HAN, and can be in communication with a communication network 20, such as the Internet or a wide area network (WAN). Furthermore, the router 16, and thus the appliances 12, can communicate with the mobile device 18 over the communication network 20. The appliances 12 and the mobile device 18 can further be in communication with a server 22, being a manufacturer server for example.

The appliances 12 of the network 10 can be a home or domestic appliance that performs a physical operation on an article or particular job in a home, including those relating to cleaning, cooking, or food preservation. The home appliance, for example in the case of a dishwasher 12, can include a housing at least partially defining a treating chamber (not shown) and having an open face selectively closed for providing access to the treating chamber. The treating chamber can receive one or more article(s), and the appliance 12 can treat the article(s) according to a useful cycle of operation. Again, in the case of a dishwasher 12, the treating chamber can receive one or more dish(es), and the dishwasher 12 can perform a cleaning system on the dish(es) in the treating chamber. Other types of appliances include but are not limited to a refrigerator, a clothes washing machine, a clothes dryer, a freezer, a range, a stove, an oven, or a cooktop can be used with the network 10. All of these examples of home appliances can receive one or more article(s), and can perform a useful cycle of operation on the article(s). Other examples of appliance types typically found within a home and which can be used with the system include an air conditioner, a water heater, and a pool pump.

The appliances 12 can be installed with an appliance communication module 24. The appliance communication module 24 can be a receiver, having transmission and reception capabilities for sending or receiving data over the network 10. While it is illustrated that the appliance communication module 24 is in direct communication with the router 16, it is contemplated that the appliance 12 can be in communication with the mobile device 18 or the communication network 20 directly, such as over a cellular network, for example.

While three appliances 12 are shown in FIG. 1, it should be understood that the network 10 can include any number of appliances including more or less than three. The appliances 12 can be located within a single home or at a common location, and some or all can be part of the HAN.

The appliance interactive display 14 can provide users with access and control of the appliances 12 and/or the HAN. Through the appliance interactive display 14, a user can monitor and control operation of the appliances 12, as well as display additional information received over the network 10.

The router 16 can be utilized to provide communication from the appliances 12 over the network 10, providing information to a local mobile device 18 over the HAN or to the mobile device 18 remotely, such as over the communication network 20. The router 16 can operate as a forwarding and translating device, passing information over the network 10 or translating data to and from the appliances 12. It should be understood that the appliances 12 can alternatively communication directly with the mobile device 18 or the communications network 20, independent of the router 16, such as over a cellular network.

The mobile device 18 can communicate information with and/or respond to requests from the appliances 12 from a remote location, either inside or outside of the home or HAN. The mobile device 18 can include a data storage unit for storing data, such as historical usage or operational data for the appliances 12 based on information from the appliance communication module 24. The mobile device can have a mobile interactive display 26 permitting a user to receive, view, or send information related to the appliances 12. The mobile device 18 can have a mobile communication module 28 for communicating with the network 10 such as an antenna or receiver. While the mobile device 18 is illustrated and generally described in relation to a mobile phone, it can, for example, comprise a smartphone, a tablet computer, a desktop computer, or a notebook computer.

The communication network 20 can be a private or public network, and can typically be a WAN (wide area network) such as the Internet. Similarly the HAN can be a private or public network, and can typically be a LAN (local area network). The router 16 forwards data between the communication network 20 and the appliances 12. The HAN can have a different communication protocol than the communication network 20, in which case the router 16 or another device (not shown) can translate the data sent between the communication network 20 and the HAN between the different communication protocols. The router 16 can be a separate device in the HAN, or it can be built into one of the appliances 12.

The server 22 can manage the appliance or mobile device's access to a centralized resource or service. For example, the server 22 can be a server for a utility provider or retailer, and can communicate information to the network 10, which can comprise a database. The database can include particularized information, such as relating to consumable goods for a shopping list or chores in developing a chore list, as well as consumables such as auto-replenish goods. Additionally, the database can include information tailored to a particular appliance. In a first example, the database information can include consumable product or recipe ingredient information that can be tailored to a stove or oven, facilitating shopping for and preparing meals. In another example, a chore list database can be tailored to a refrigerator, for developing a chore list which is displayed to the family. Furthermore, the server 22 can be a server of a manufacturer of the appliance 12 or some other third-party, and can communicate information similar to that of a utility provider or retailer, as well as functional information related to the operation of the appliance. While only one server 22 is shown in FIG. 1, it should be understood that the network 10 can include multiple servers 22. The servers 22 can communicate with one or more utility providers, retailers, or manufacturers via the communication network 20 and, in the case where the communications network 20 is the Internet, can be the same communication network.

An appliance communication module 24, such as a transceiver can be used to connect each appliance 12 to the router 16 and the network 10, and can be a separate or an external device or it can be carried by or, as shown in FIG. 1, built into the appliances 12. The appliance communication module 24 can communicate with the network 10 by a wireless or wired connection. The appliance communication module 24 is associated with the appliance 12 for both sending and receiving signals sent via the communication network 20 or the mobile device 18.

Appliances 12 have increasing scopes of functionality with advances in technology, being able to provide the user a more involved interaction at the appliance interactive displays 14. For example, a user can receive weather, media, or similar information displayed on the appliance interactive display 14. The increased functional capabilities of the appliances 12 provides for the potential to utilize an appliance 12 beyond typical operational parameters and cycles of operation in which the appliance 12 was originally intended.

Figure 2:
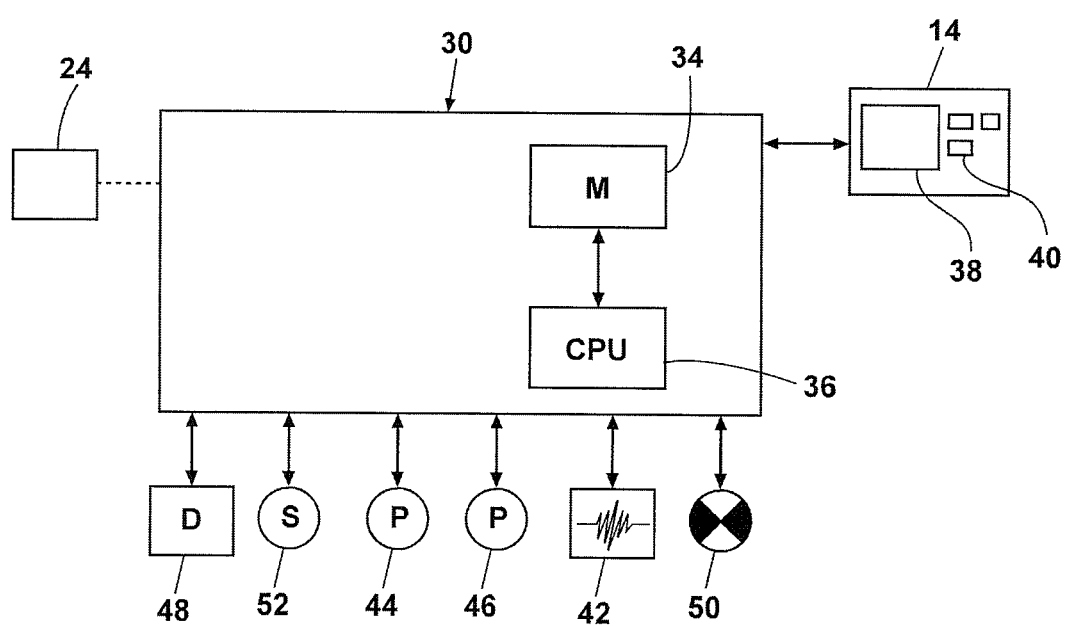
FIG. 2 is a schematic view of a controller of the appliance of FIG. 1.

Turning now to FIG. 2, a controller 30 for the appliances 12 is illustrated. The controller 30 controls the operation of the appliance 12 to implement one or more cycles of operation. The controller 30 can be located within one or more of the appliances 12 and be operably coupled with a control panel or the appliance interactive display 14 for receiving user-selected inputs and communicating information to the user. The appliance interactive display can include operational controls such as dials, lights, switches, and displays enabling a user to input commands, such as a cycle of operation, to the controller 30, and receive information. The appliance interactive display can, for example, include at least one display 38 and at least one selector or button 40. The display 38 can include lights or other discrete indicators with accompanying text, or a graphical user interface, such as a touch screen. The button 40 can include a push button, switch, or dial on the appliance interactive display 14 that a user physically actuates, or a virtual button on a graphical user interface, such the display 38. Alternatively or in addition, the appliance interactive display 14 can be used as a user interface for the appliance 12, and can be coupled with the controller 30. Options can be provided for the user to select or control how the appliance 12 operates and reacts to input commands or options. Such selections can be made at the appliance 12, through the appliance interactive display 14. Additionally, these selections, an operations state, or other information can be transmitted from the appliance 12 via the appliance communication module 24.

As illustrated in FIG. 2, the controller 30 can be provided with a memory 34 and a central processing unit (CPU) 36. The memory 34 can include any suitable computer-readable media. The memory 34 can be used for storing communication software, which is configured to effect communication between the controller 30 and the network 10, such as the HAN or the communication network 20. The memory 34 can also be used for storing control software that is configured to effect one or more cycles of operation by the appliances 12. Examples, without limitation, of cycles of operation in the case of a dishwasher 12 include: Smart Wash, Pots/Pans, Normal Wash, China/Gentle, Fast Wash, and Quick Rinse. The communication and control software can be executed by the CPU 36. The memory 34 can also be used to store information, such as a database or table, and to store data received from one or more components of the appliance 12 that can be communicably coupled with the controller 30. The database or table can be used to store the various operating parameters for the one or more cycles of operation, including factory default values for the operating parameters and any adjustments to them effected by the control system or by user input.

The controller 30 can be operably coupled with one or more components of the appliance 12 for communicating with and controlling the operation of the component to complete a cycle of operation. For example, in the case of a dishwasher as the appliance 12, the controller 30 can be operably coupled with a heater 42 for heating wash liquid during a cycle of operation, a drain pump 44 for draining liquid from the treating chamber, a recirculation pump 46 for recirculating wash liquid during a cycle of operation, a dispenser 48 for dispensing a treating agent during a cycle of operation, one or more valve(s) 50 for controlling the flow of liquid or air through the treating chamber, and one or more sensor(s) 52 to control the operation of these and other components to implement one or more of the cycles of operation. Non-limiting examples of a sensor 52 that can be communicably coupled with the controller 30 include a temperature sensor and a turbidity sensor to determine the soil load associated with a selected grouping of dishes, such as the dishes associated with a particular area of the treating chamber. In the case of other types of home appliances, the controller 30 can be operably coupled with components typical to such appliances that are commonly controlled.

Similar to the appliance 12, the mobile device 18 can have a controller 30 being similar to that of FIG. 2. The controller 30 can be used to operate the mobile device 18 and implement control or operational software used in operation of the mobile device 18.

Each of the appliance 12 and the mobile device 18 can utilize the controller 30 to display and run an application. The application can comprise software executed by the CPU 36 and stored in the memory 34. The application can be displayed on the appliance interactive display 14 or the mobile interactive display 26 while running. The application can include features or functionalities that can be interacted with by a user as a user interface with the mobile or appliance interactive displays 14, 26. The application can be configured to create and further interact with a user interface on either the mobile or appliance interactive displays 14, 26.

Figure 3:
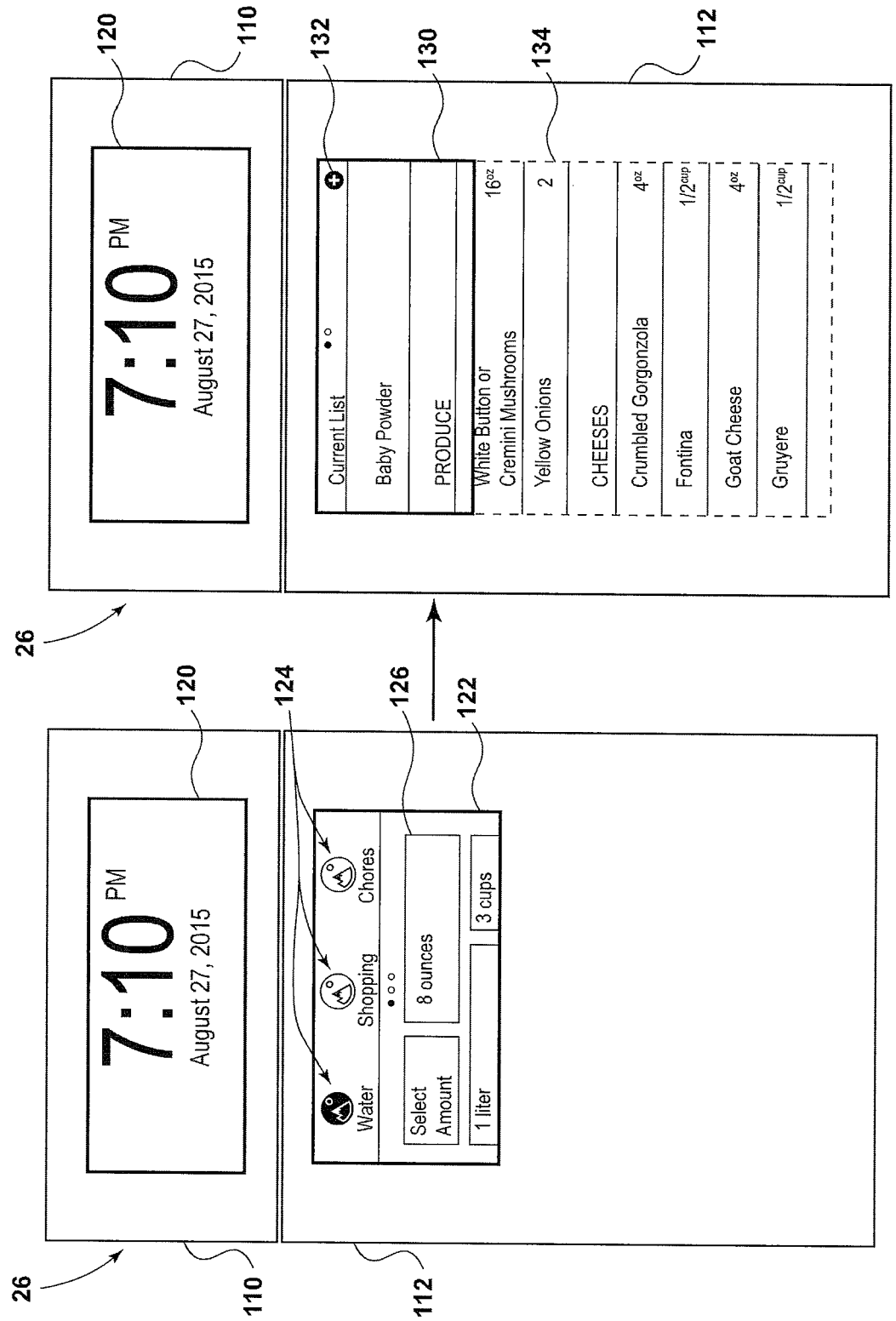
FIG. 3 is a view of the mobile device of FIG. 1 illustrating a mobile interactive display.

Looking at FIG. 3, two exemplary mobile interactive displays 26 are shown. It should be appreciated that the interactive displays illustrate an exemplary application, used to facilitate the reader's understanding of the inventive concept. The application can be a software program designed for creating a user interface and to remotely interact with the appliance 12. For example, the application can comprise a mobile application or "app", or a website or web page. The left-hand mobile interactive display 26 comprises a title window 110 and an operational window 112. The title window 110 can contain general information 120, such as the time and date. The operational window 112 can comprise a functional section 122, having interactable elements. The interactive elements can comprise buttons 124, identifying different functional categories, for example. Within each category button 124, additional sub-buttons 126 can provide functionality within each category. For example, the water button 124 is highlighted in FIG. 3, having different amount values for the water as a sub-buttons 126.

The right-hand mobile interactive display 26 illustrates a list 130, which can comprise the operational window 112. The list 130 can be a grocery list displayed when selecting the shopping button illustrated on the left-hand display. The list 130 can comprise a plurality of selections 134, illustrated as different produce and cheeses, which can be added to a stored shopping list by pressing an add button 132.

It should be appreciated that FIG. 3 illustrates exemplary displays and functionalities for creation of the user interface on the mobile interactive display 26. Different layouts, images, functionalities, applications and organizations are possible, with the design as shown only representative of the capabilities of the mobile interactive display 26 necessary to understanding the inventive concept.

Figure 4:
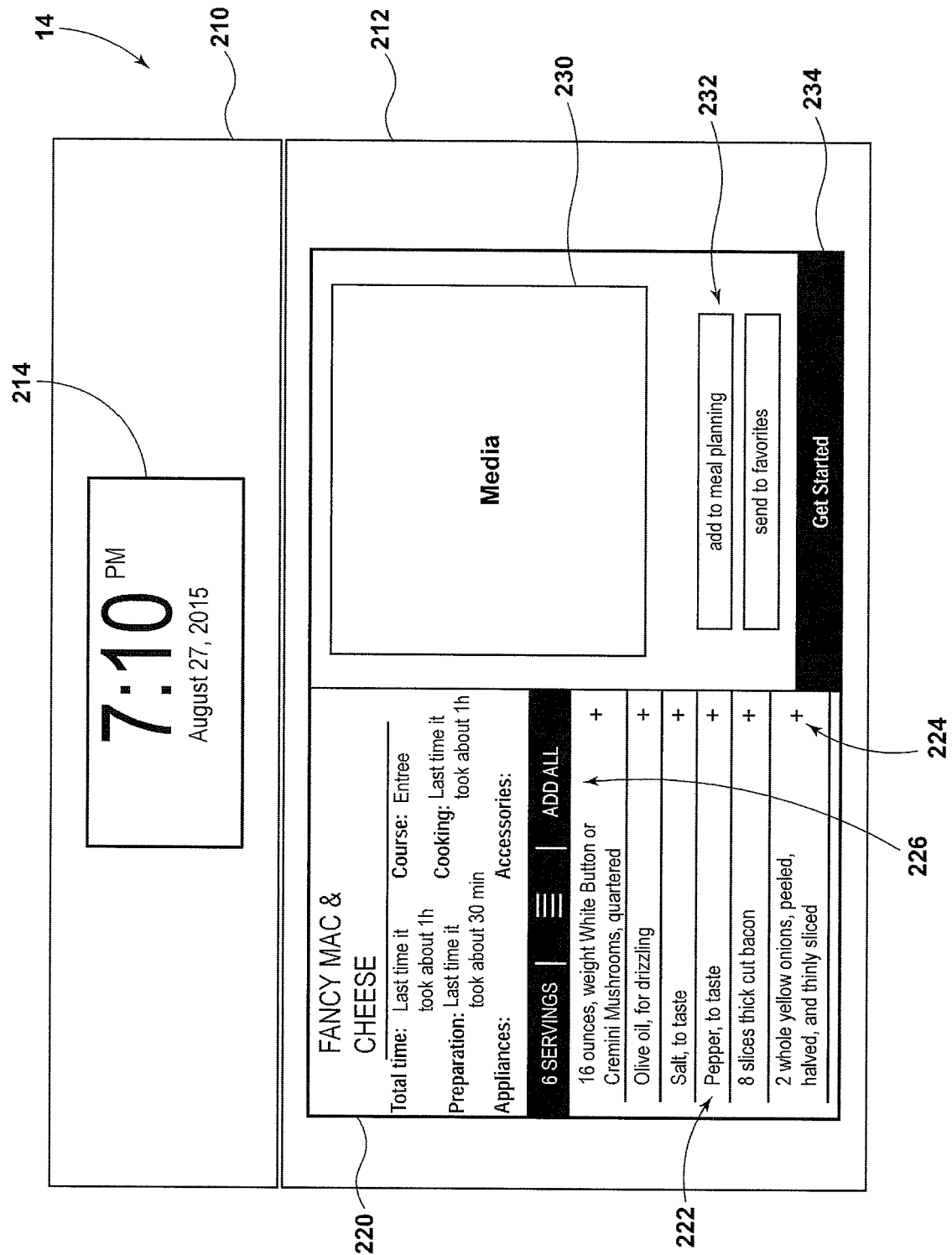
FIG. 4 is a view of an appliance interactive display.

Turning now to FIG. 4, an exemplary appliance interactive display 14 is shown, and can be a display for a stove or oven type appliance 12. The appliance interactive display 14 can have a title window 210 and an operational window 212. The title window 210 can show general information 214 such as the time and date. The operational window 212 can have detailed information related to the appliance 12. In the example of the oven or stove, as shown, the operational window 212 can display recipe information, including directions 220 and ingredients. A list 222 of ingredients necessary for the recipe can have add functionalities 224, or an add all functionality 226, for adding the ingredients to a virtual shopping list. Additional functionalities can include media 230, additional buttons 232, or a get started button 234 for preparing and executing the recipe. The media 230 can comprise images or videos related to the recipe, while the additional buttons 232 can add the recipe to a meal planning functionality or a favorite recipes virtual list.

Similar to the mobile interactive display 26, the appliance interactive display 14 is exemplary and displays one potential implementation of displays and functionalities for the appliance interactive display 14. Different layouts, images, functionalities, and organizations for the appliance interactive display 14 are possible, with the design only being exemplary of the capabilities of the appliance interactive display 14 necessary to the understanding of the inventive concept.

The user interface on the mobile interactive display 26 has the ability to be modified, created, and interacted with by a user operating the mobile device 18. Such exemplary modifications, creations, or interactions can include a recipe or grocery shopping list, a chore list, auto-replenish list, or similar for which it can be desirable to display on an appliance 12. Specific examples of the modifications, creations, or interactions can include adding ingredients to a recipe list, adding products to a grocery list, or adding chores to a chore list such as cleaning the dishes. In the examples shown in FIG. 3, a user can add "White Button or Cremini Mushrooms" to a shopping list on the mobile interactive display. The modified, created, or interacted-with mobile interactive display 26 is then cast to the appliance interactive display 14 over the network 10. The act of casting can be completed by user action or can be automatic. The cast mobile interactive display 26 is displayed on the appliance interactive display 14, displaying the information from the mobile interactive display 26. In the example shown in FIG. 4, the appliance interactive display 14 can display a recipe utilizing the "White Button or Cremini Mushrooms." The cast display can have a similar appearance and functionality, however, can be formatted for display on the appliance interactive display 14 without being a replication of the user interface from the mobile interactive display 26.

From the cast appliance interactive display 14, a user can interact with the appliance 12 at the appliance interactive display 14 and update or interact with the appliance interactive display 14 independent of the mobile device 18. The user can interact with the appliance interactive display 14 without the need for the mobile interactive display 26 being active. For example, a user can add groceries to a grocery list on the mobile interactive display 26 on a mobile phone. One example, shown in FIG. 4, could include adding "8 slices of thick cut bacon" to the grocery list, suggested by the recipe on the appliance interactive display 14. Additional groceries can be added to the list independent of interaction with the mobile interactive display 26. Thus, the appliance, in one example, can suggest recipes based upon ingredients added to the user interface on the mobile interactive display 26.

It should be appreciated that the examples and displays described with regard to FIGS. 2-4 are exemplary of appliances 12, appliance interactive displays 14, mobiles devices 18, and mobile interactive displays 26 where a user can create a user interface on the mobile interactive display 26 utilizing an application, having the created user interface cast to the appliance interactive display 14 where a user can interact with the appliance interactive display 14 independently of the mobile device 18 or the mobile interactive display 26.

Figure 5:
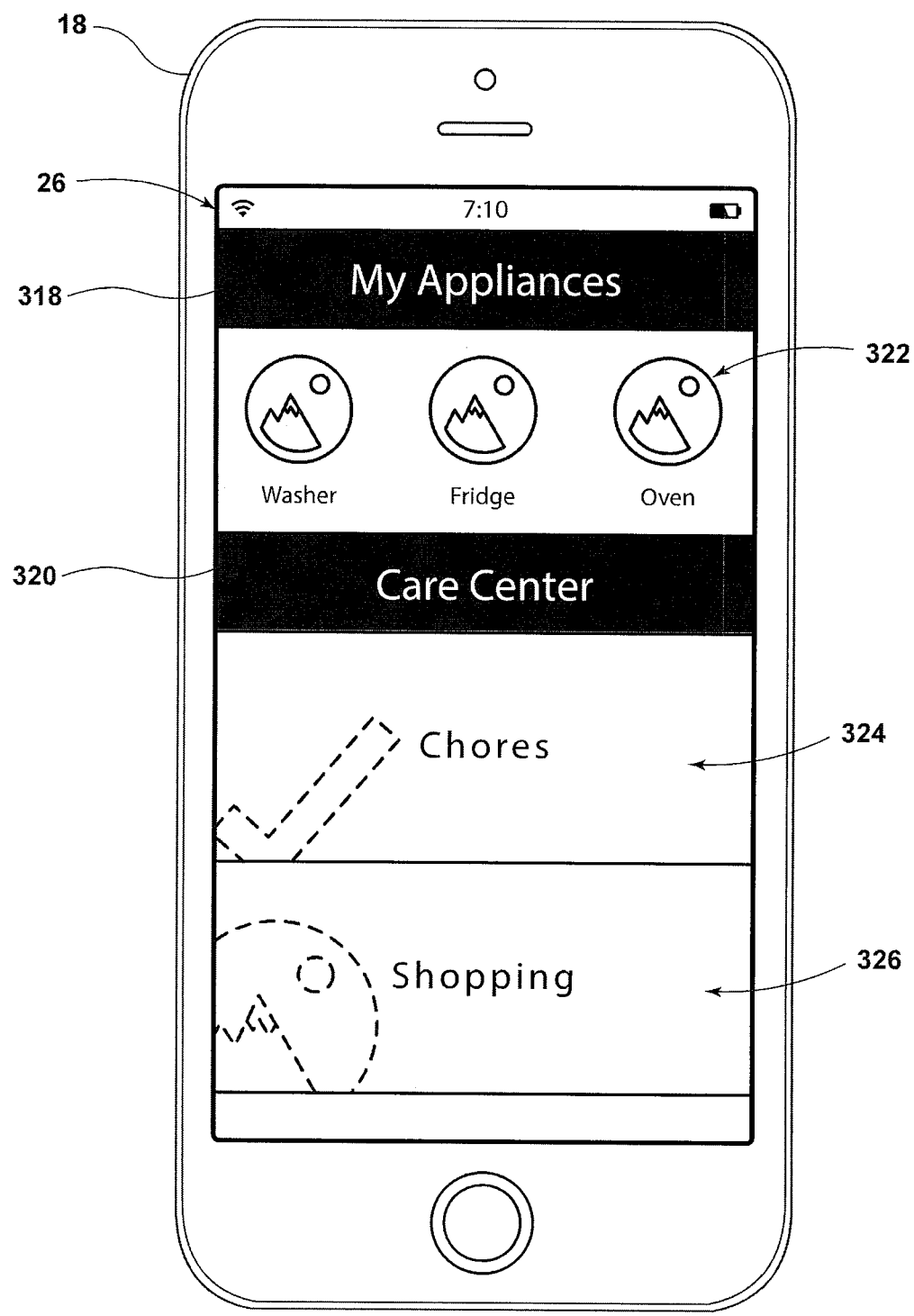
FIG. 5 is a view of the mobile device of FIG. 1 illustrating the mobile interactive display showing an interface overview.
Figure 6:
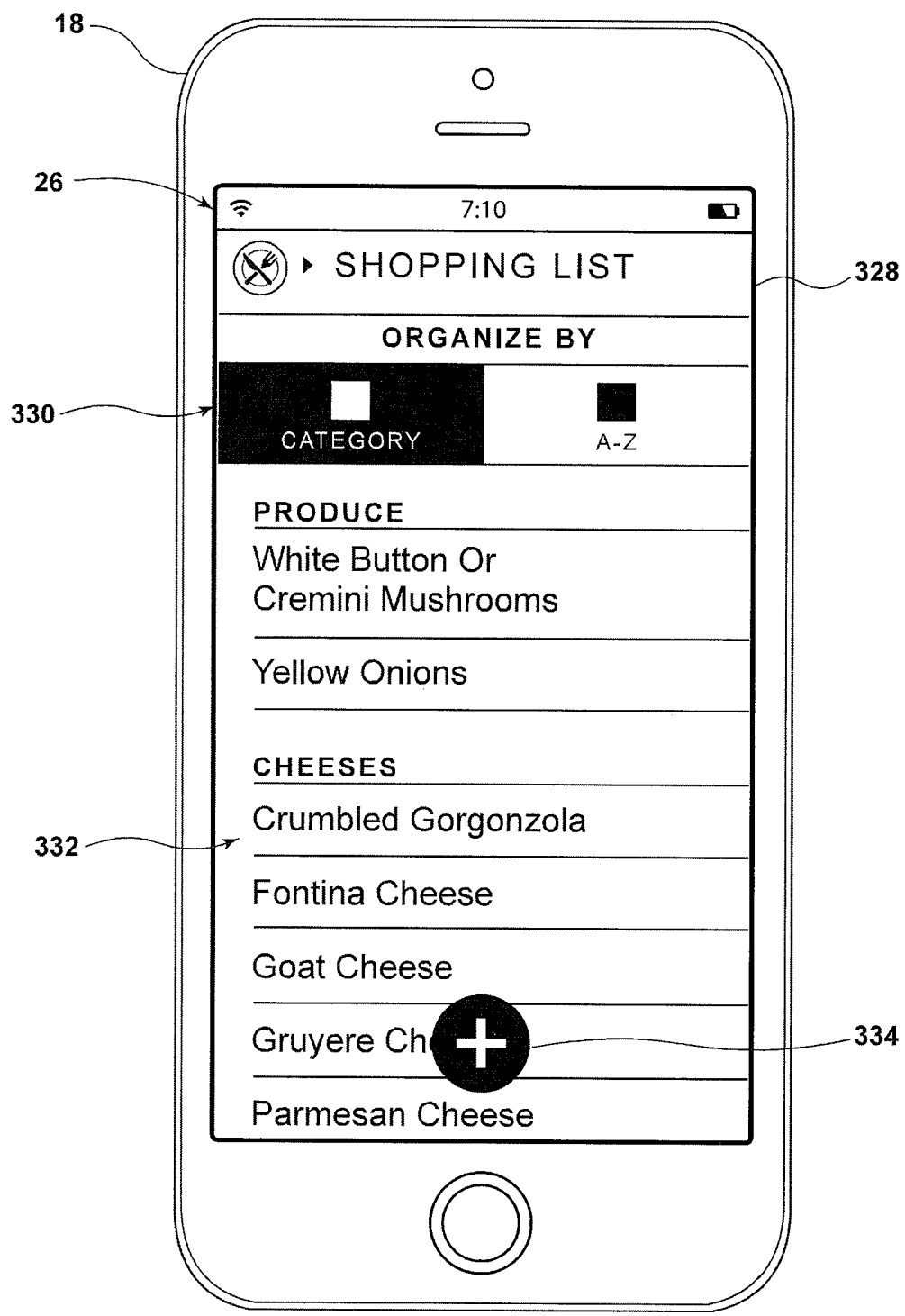
FIG. 6 is a view of the mobile device of FIG. 5 illustrating the mobile interactive display showing a shopping list.
Figure 7:
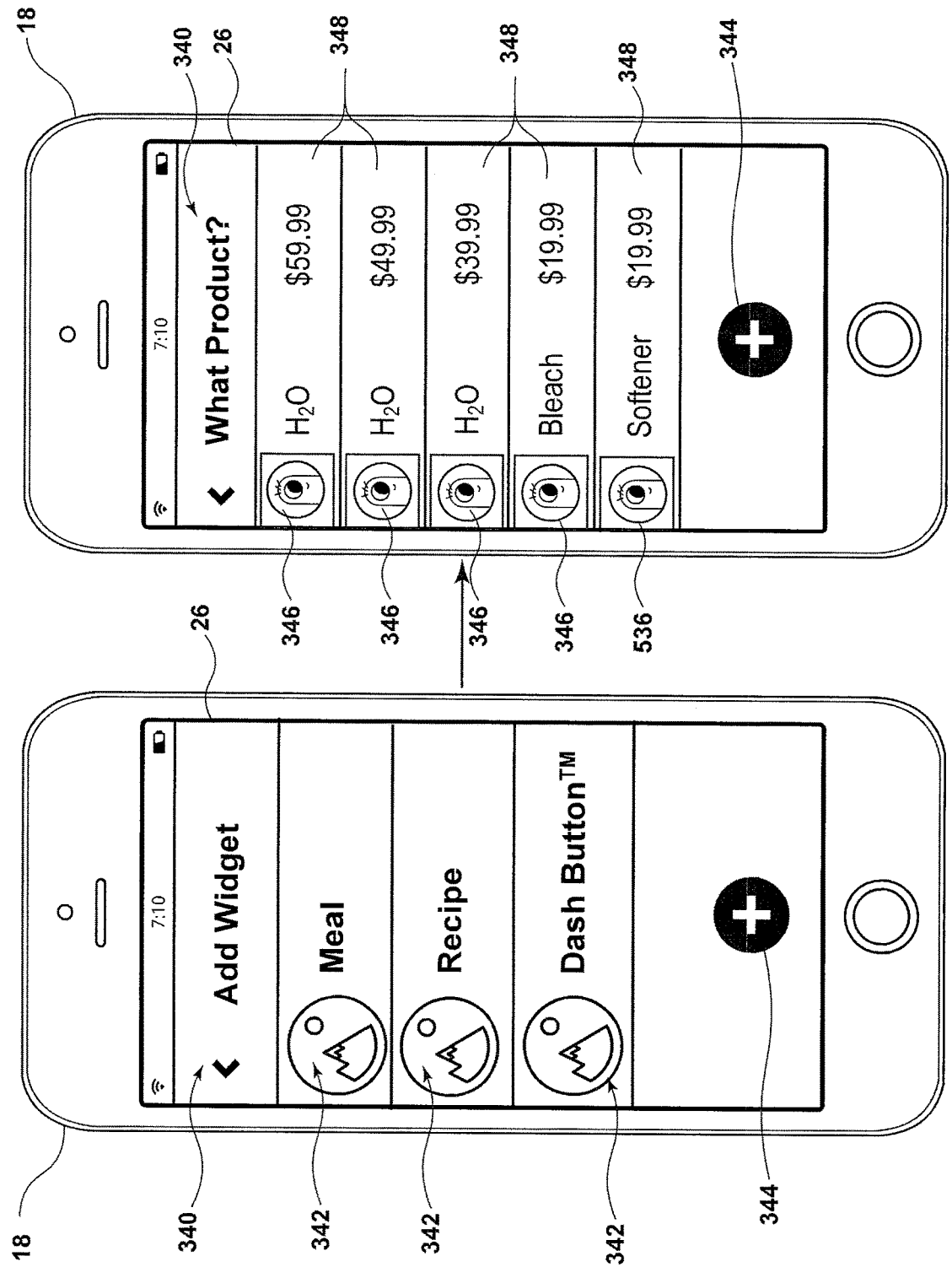
FIG. 7 is a view of the mobile device of FIG. 5 illustrating the mobile interactive display showing an auto-replenish feature.

Turning now to FIGS. 5-7, additional exemplary mobile interactive displays 26 are illustrated, depicting additional user interfaces which can be created on an application on the mobile device 18. FIG. 5 illustrates a mobile interactive display 26 illustrating an overview for creating a user interface, having a list of appliances 318 that can be connected to the network 10 and a care center 320 for generating one or more particular user interfaces, such as chores, auto-replenish, or shopping lists. The list of appliances 318 is exemplary, including a washer, fridge, and oven button 322, which can shows care center functionalities tailored to the particular appliance, as well as other functionalities of the appliance 12 such as time left on a cycle of operation. The care center 320 can include a list of functionalities for generating a user interface, shown as a chores function 324 and a shopping function 326.

In FIG. 6, an exemplary shopping list user interface is shown for the mobile interactive display 26, having a title section 328 and organization buttons 330, depicted as a category organization and an alphabetical organization. The mobile interactive display 26 can also show a shopping list 332 comprising a plurality of shopping items which can be or have been added to the shopping list 332. Additionally, an add function 334 can be utilized for adding additional ingredients to the shopping list 332 on the mobile device 18.

In FIG. 7, an exemplary list illustrates multiple widgets which can be utilized for creating the user interface. On the right hand mobile interactive display 26, a title section 340 illustrates that the selectable buttons are for adding widgets to the user interface. A plurality of widgets 342 can be included in the user interface such as a meal, recipe, or a Dash Button™. Additionally, an add button 344 can be used to add more widgets 342 to the list. The Dash Button widget 342 can be selected, moving to the right-hand display. The Dash Button feature can be used as an auto-replenishment feature for quickly and conveniently replenishing consumables 348 for a particular appliance 12. For example, where the appliance 12 comprises a washing machine, the replenishable consumable 348 can be $H_2O$ treating chemistries listed at variable prices or features. Additional treating consumables such as fabric softener, bleach, or other treating chemistries can be utilized on the list. The add button 344 can be used to add the consumable 348 to a shopping list, such as the list shown in FIG. 6, or can be a separate list tailored to replenishment of just appliance consumables.

The mobile interactive displays 26 for FIGS. 5-7 are exemplary and are examples of different user interfaces that can be created on the mobile device 18 to be cast to the appliance interactive display 14. The display layouts, images, functionalities, and organizations are exemplary and should not be construed as limiting of the inventive concept.

Figure 8:
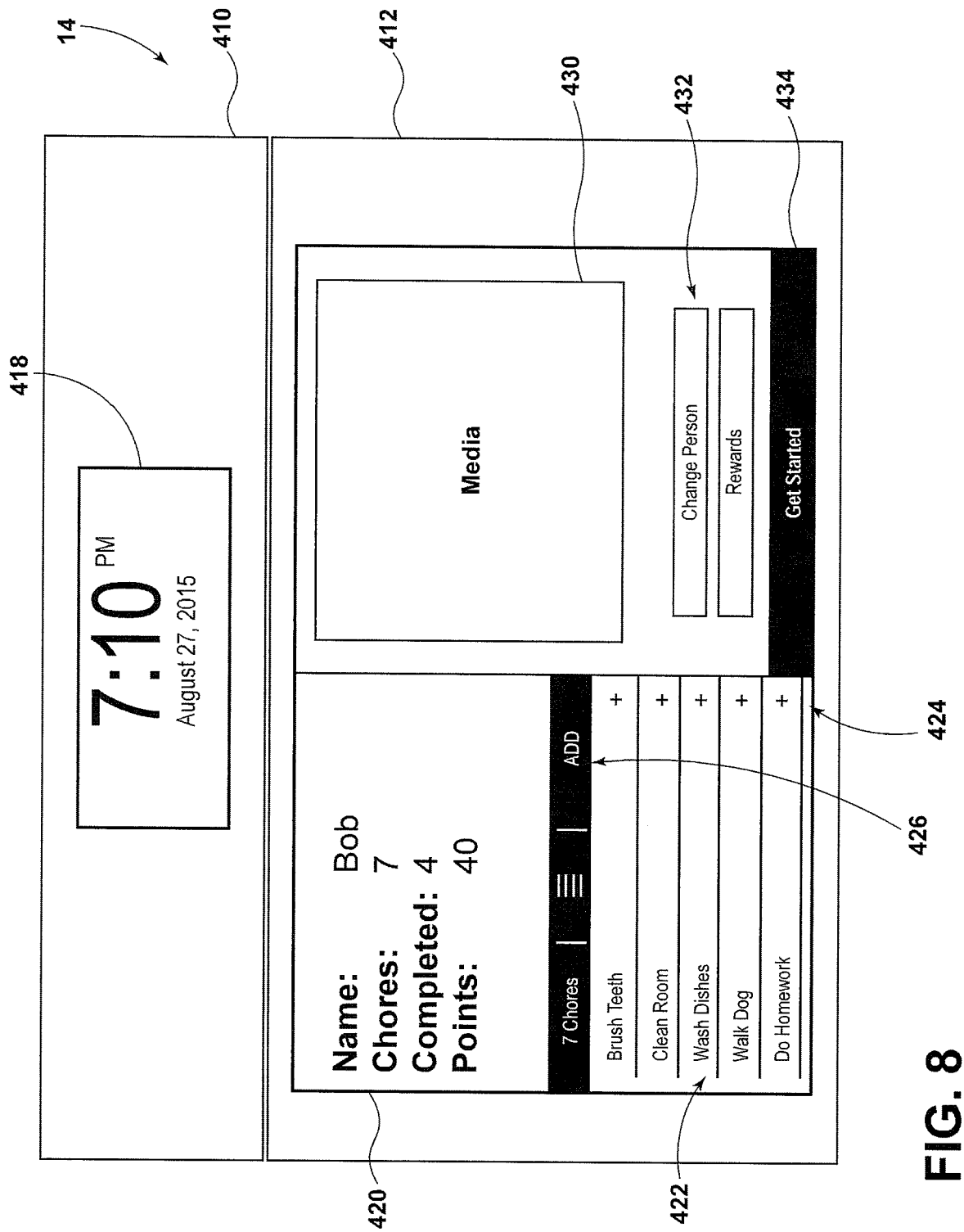
FIG. 8 is a view of the appliance interactive display illustrating a chore list.

Turning now to FIG. 8, an appliance interactive display 14 is illustrated, which can be displayed, for example, on a refrigerator or washing machine. The appliance interactive display 14 can have a title window 410 and an operational window 412. The title window 410 can have general information 418 such as date and time. The operational window 412 can have functional information for creating a user interface on an application displayed on the appliance interactive display 14. For example, an information window 420 can have information related to chores for a particular user. Additional chores can be displayed as a chore list 422. Add buttons 424 or an add feature 426 can be utilized to add one or more chores to a specified user at the appliance interactive display 14. The appliance interactive display 14 can display additional information related to the chores, such as media 430 illustrating videos, images, or similar media related to a particular chore. Furthermore, the appliance interactive display 14 can have additional features such as a change person button 432 for selecting another user, or a rewards button displaying rewards for chore completion, as two examples. Additionally, a get started button 434 can return the user to a standard user interface for the appliance interactive display 14.

It is understood that the appliance interactive display 14 is exemplary and displays one potential implementation of displays and functionalities for an application on the appliance interactive display 14. Different layouts, images, functionalities, and organizations for the appliance interactive display 14 are possible, with the design only being exemplary of the capabilities of the application and appliance interactive display 14 necessary to the understanding of the inventive concept.

Figure 9:
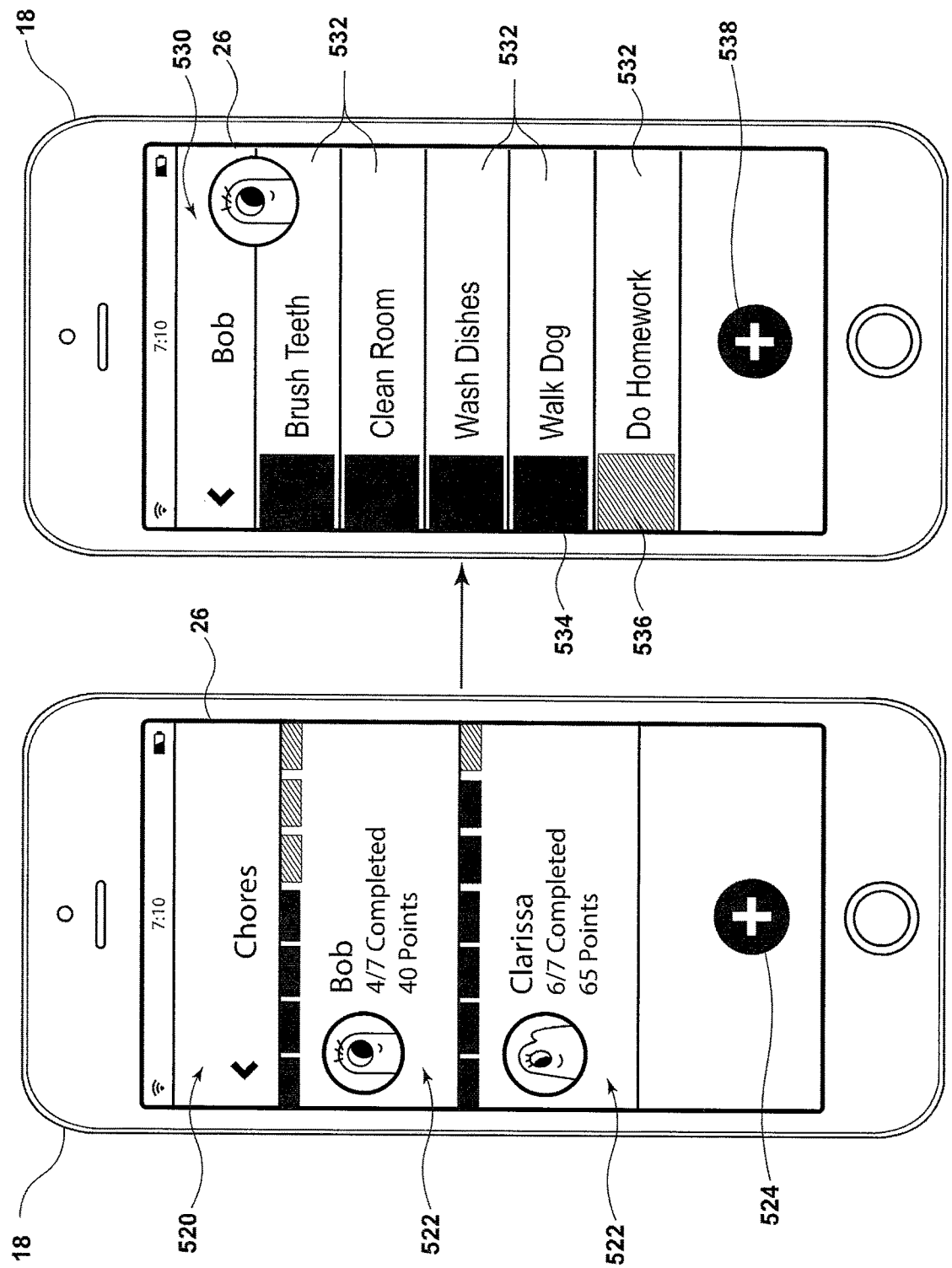
FIG. 9 is a view of the mobile device illustrating interaction with the mobile interactive display showing a chore list.

Turning now to FIG. 9, the appliance interactive display 14 can be cast to the user interface on the mobile interactive display 26 of the mobile device 18. As illustrated, the user interface for the mobile interactive display 26 can differ from that of the appliance interactive display 14, while it is contemplated that the displays can be similar or the same. The appearance and functionality can be similar, while being formatted for display on the mobile interactive display 26. The mobile interactive display 26 can be changed by a user interacting with the mobile interactive display 26 independently of the appliance 12. The appliance interactive display 14 need not be active for a user to interact with the user interface of the mobile interactive display 26. In one example, as illustrated in the left-hand display, the mobile interactive display 26 can have a title section 520, showing a chore section. Below the title section 520, a list can display different users 522 showing information relating to current chore queue. Such information can include current chore completion or earned reward points resultant from chore completion. Furthermore, the mobile interactive display 26 can have an add button 524 for adding additional users to the list where they can be assigned chores.

Upon selecting a user on the left-hand display, the mobile interactive display 26 can change to another display listing details for the particular user, shown as the right-hand display. A specific title 530 can display information particular to the user, while the list below can have one or more chores 532, assigned to that user. The chores can be labelled by color or similar identifying marks, such as a dark label 534 for completion and a light label 536 for incompletion. Additionally, an add button 538 can be used to add additional chores to the list.

Similar to the appliance interactive display 14, the mobile interactive display 26 is exemplary and displays one potential implementation of displays and functionalities for the mobile interactive display 26. Different layouts, images, functionalities, and organizations for the mobile interactive display 26 are possible, with the design only being exemplary of the capabilities of the mobile interactive display 26 necessary to the understanding of the inventive concept.

Concerning FIGS. 8 and 9, it should be understood that a user can create a user interface on an application run on the appliance interactive display 14 and cast the user interface to the mobile interactive display 26. The act of casting can be completed by user action or can be automatic. Casting can be completed when the appliance 12 is in communication with the mobile device 18. The cast user interface can be displayed on the mobile device 18 where the user interface can be changed on the mobile device 18 at the mobile interactive display 26 independently of the appliance 12.

Thus, in the example shown in FIGS. 8 and 9, a user can create a chore list on the appliance 12. The chore list can be particular to a certain user. The chore list is cast to the mobile device 18 of a user, "Bob" in the example, where "Bob" can review and complete chores assigned to him. "Bob" can interact with and update the mobile interactive display 26 independent of the appliance interactive display 14.

Figure 10:
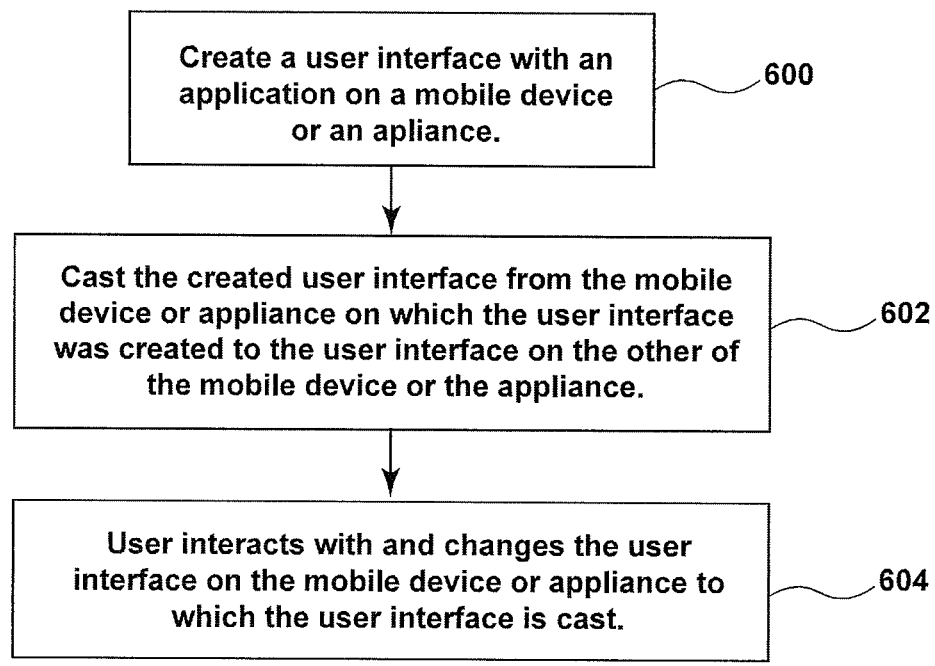
FIG. 10 is a flow chart illustrating a method for casting a user interface.

Turning now to FIG. 10, a flow chart illustrates a method of casting a user interface between a mobile device and an appliance. At 600, a user can create a user interface with an application on either a mobile device or an appliance. The user can interact with a mobile interactive display on the mobile device or an appliance interactive display on the appliance, which can be loaded with the application, to create the user interface. Upon creation of the user interface, at 602, the user interface is cast from the mobile device or appliance it was created on to the other of the mobile device or appliance. Additionally, the user interface can be cast to multiple mobile devices or appliances and is not limited to a single unit. Upon being cast, the user interface can be interacted with on the receiving mobile device or appliance. At the receiving mobile device or appliance, the user can change the user interface independently of the mobile device or appliance from which the user interface was originally cast.

Furthermore, the user interface can be utilized to create a shopping list or a chore list, as well as can be created for an auto-replenishment for a usable item, such as detergent for a dishwasher. The mobile device or appliance can be linked to a database facilitating the creation of the shopping list or the chore list, where the database can include data related to grocery items or particular chores. Additionally, the application on the user interface can be particularly tailored to the creation of a chore list or a shopping list.

It should be understood that as described herein, a user interface can be created on either an appliance at an appliance interactive display or a mobile device at a mobile device interactive display. The created user interface can be cast to the appliance from the mobile device or from the mobile device to the appliance. The cast user interface can then be updated and interacted with independent of either the appliance or mobile device it was originally sent. While the user interface can be used independently of one another, the appliance and the mobile device can be synced, where they can update respective of the changes being made on the opposite device.

It is desirable to utilize user interfaces on appliances beyond simply functioning to implement cycles of use. In one example, it is common for a user to write a shopping list on a refrigeration appliance. The ability to generate a shopping list on the user interface of the refrigeration appliance and cast that list to a mobile device improves the usability of the refrigeration appliance beyond simply storing products.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A mobile device for use with a home network including at least one appliance having an appliance interactive display and an appliance communication module, the mobile device comprising:
   a mobile interactive display;
   a mobile communication module; and
   an application on the mobile device, configured to receive and display on the mobile interactive display a received user interface cast from at least one appliance and enable a user to create a user interface on the mobile interactive display, the created user interface configured to have the ability to be modified by the user and display updated information particular to certain users of the appliance interactive display, and to cast the created user interface to the appliance interactive display of the at least one appliance when the mobile communication module is in communication with the appliance communication module of the at least one appliance;
   wherein the received user interface on the appliance interactive display can be changed by a user interacting with the appliance interactive display independently of the mobile device.

2. The mobile device of claim 1 wherein the received user interface is at least one of a shopping list, auto-replenishment list, or a chore list.

3. The mobile device of claim 2 wherein the application is linked to a recipe database to facilitate creation of the shopping list.

4. The mobile device of claim 2 wherein the received user interface is the chore list and the application is linked to specific appliances to facilitate tailoring the chore list to the specific appliances.

5. The mobile device of claim 1 wherein the created user interface need not be active on the mobile device to cast the user interface to the appliance interactive display of the at least one appliance.

6. The mobile device of claim 5 wherein the created user interface need not be active on the mobile device to change the user interface with the appliance interactive display of the at least one appliance.

7. The mobile device of claim 1 wherein the created user interface cast to the appliance interactive display of the at least one appliance comprises a similar appearance and functionality being formatted for display on the appliance interactive display of the at least one appliance.

8. A home appliance configured to perform a physical operation on an article comprising:
- an appliance interactive display;
- an appliance communication module; and
- an application on the appliance, configured to enable a user to receive a user interface on the appliance interactive display from a mobile device, the received user interface configured to have the ability to be modified by the user and display updated information particular to certain users, of the appliance interactive display, the application further configured to enable the user to receive the user interface on the appliance being cast from the mobile device when the appliance communication module is in communication with the mobile device;
- wherein the received user interface on the appliance interactive display can be changed by a user interacting with the appliance interactive display independently of the mobile device.

9. The home appliance of claim 8 wherein the received user interface is at least one of a shopping list, auto-replenishment list, or a chore list.

10. The home appliance of claim 9 wherein the received user interface is the shopping list and the application is linked to a recipe database to facilitate creation of the shopping list.

11. The home appliance of claim 9 wherein the received user interface is the chore list and the application is linked to specific appliances to facilitate tailoring the chore list to the specific appliances.

12. The home appliance of claim 8 wherein the received user interface need not be active on the mobile device to cast or change the user interface on the appliance.

13. An appliance configured to perform a physical operation on an article, the appliance including an application installed on the appliance, the application configured to instruct the appliance to perform the physical operation, further comprising:
- a mobile device including a mobile interactive display configured to create an user interface, wherein the mobile device can communicate with the appliance to instruct the appliance to perform the physical operation;
- wherein the application is configured to enable a user to receive the user interface at an appliance interactive display on the appliance, the received user interface configured to have the ability to be modified by the user and display information particular to certain users of the appliance interactive display, and to receive the created user interface to the appliance interactive display on the appliance when the mobile device is in communication with the appliance; and
- wherein the received user interface on the appliance interactive display can be changed by the user interacting with the appliance interactive display independently of the mobile device.

14. The appliance of claim 13 wherein the created user interface on the mobile device comprises a similar appearance and functionality being formatted for the received user interface on the appliance interactive display.

15. A method of casting a user interface from a mobile device to an appliance, the method comprising:
- creating the user interface with an application on a mobile interactive display of the mobile device, the created user interface configured to have the ability to be modified by a user and display updated information particular to certain users; and
- casting the created user interface from the mobile device to the appliance; and
- wherein the user can change the casted user interface by interacting with an appliance interactive display on the appliance to which the created user interface is cast independently of the mobile device.

16. The method of claim 15 wherein creating the user interface comprises creating one of a chore list, auto-replenishment list, and a shopping list.

17. The method of claim 15 further comprising linking one of the mobile device or the appliance to a database.

18. The method of claim 17 further comprising facilitating the creating of the user interface.

19. The method of claim 18 further comprising tailoring the appliance interactive display to one of a chore list or a shopping list.

* * * * *